(12) United States Patent
Blazsovszky

(10) Patent No.: US 11,908,333 B2
(45) Date of Patent: Feb. 20, 2024

(54) PROCEDURE OF DETERMINING AIRCRAFT POSITION AND ARRANGEMENT FOR CARRYING OUT THE PROCEDURE

(71) Applicant: HUNGAROCONTROL ZRT., Budapest (HU)

(72) Inventor: Gyorgy Blazsovszky, Nadap (HU)

(73) Assignee: HUNGAROCONTROL ZRT, Budapest (HU)

( * ) Notice: Subject to any disclaimer, the term of this patent is extended or adjusted under 35 U.S.C. 154(b) by 441 days.

(21) Appl. No.: 17/292,838

(22) PCT Filed: Dec. 20, 2018

(86) PCT No.: PCT/IB2018/060432
§ 371 (c)(1),
(2) Date: May 11, 2021

(87) PCT Pub. No.: WO2020/099919
PCT Pub. Date: May 22, 2020

(65) Prior Publication Data
US 2021/0398433 A1     Dec. 23, 2021

(30) Foreign Application Priority Data

Nov. 16, 2018   (HU) .................................. P1800386
Dec. 13, 2018   (HU) .................................. P1800427

(51) Int. Cl.
*G08G 5/00*      (2006.01)
*H04W 4/029*    (2018.01)
(Continued)

(52) U.S. Cl.
CPC ......... *G08G 5/0039* (2013.01); *G08G 5/0008* (2013.01); *G08G 5/0034* (2013.01);
(Continued)

(58) Field of Classification Search
CPC .. G08G 5/0039; G08G 5/0008; G08G 5/0034; G08G 5/0013; H04W 4/029;
(Continued)

(56) References Cited

U.S. PATENT DOCUMENTS

RE39,829 E  *  9/2007  Smith .................. G01S 5/0081
                                                        342/450
8,559,971 B1 * 10/2013 Garcia ................. H04W 64/00
                                                        340/8.1
(Continued)

*Primary Examiner* — Adam R Mott
*Assistant Examiner* — Sagar KC
(74) *Attorney, Agent, or Firm* — Bayramoglu Law Offices LLC

(57) ABSTRACT

A procedure for a positioning of an aircraft is provided. An airspace user initiates using of a service provided by an air traffic manager and sends identifying data to the air traffic manager, the air traffic manager registers an aircraft identifier, carries out a standalone positioning. As the aircraft identifier, an International Mobile Subscriber Identity (IMSI) number of a code card connected to a switched on on-board device and placed on board the aircraft is used, the airspace user logs in to a cellular network contracted by the air traffic manager, time stamps emitted by at least three cellular base stations are recorded, then observed time difference of arrival data proportionate to a distance from the at least three cellular base stations are calculated, the observed time difference of the arrival data are sent through the cellular network to a location based server.

19 Claims, 1 Drawing Sheet

(51) Int. Cl.
*H04W 8/18* (2009.01)
*H04W 4/42* (2018.01)
*H04W 84/06* (2009.01)

(52) U.S. Cl.
CPC ........... *H04W 4/029* (2018.02); *H04W 8/183* (2013.01); *H04W 4/42* (2018.02); *H04W 84/06* (2013.01)

(58) Field of Classification Search
CPC ....... H04W 8/183; H04W 4/42; H04W 84/06; G01S 5/10
See application file for complete search history.

(56) References Cited

U.S. PATENT DOCUMENTS

| | | | |
|---|---|---|---|
| 2003/0008669 A1* | 1/2003 | Stein | H04W 64/00 342/357.29 |
| 2004/0189521 A1* | 9/2004 | Smith | G01S 13/723 342/465 |
| 2005/0020241 A1* | 1/2005 | Holland | H04W 4/02 455/404.1 |
| 2011/0057830 A1* | 3/2011 | Sampigethaya | G01S 11/08 342/36 |
| 2016/0155342 A1* | 6/2016 | Gibson | G08G 5/0021 701/409 |
| 2017/0318417 A1* | 11/2017 | Kusumoto | H04W 4/021 |
| 2018/0172797 A1* | 6/2018 | Hauswald | G01S 13/933 |
| 2018/0218619 A1* | 8/2018 | Brown | G08G 5/0069 |
| 2019/0043367 A1* | 2/2019 | Wang | G05D 1/0055 |
| 2020/0200916 A1* | 6/2020 | Berggren | G01C 21/16 |

\* cited by examiner

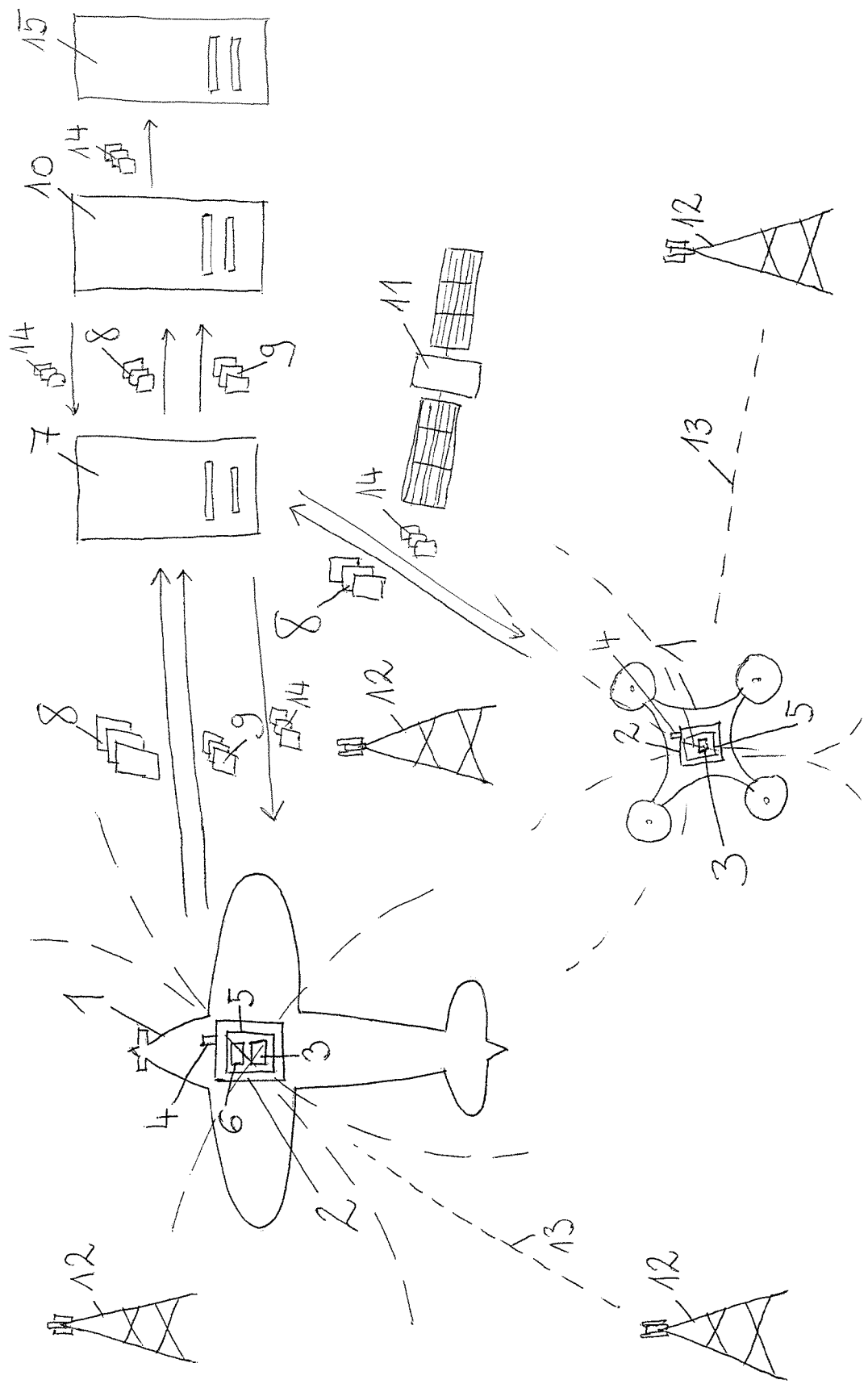

PROCEDURE OF DETERMINING AIRCRAFT POSITION AND ARRANGEMENT FOR CARRYING OUT THE PROCEDURE

CROSS REFERENCE TO THE RELATED APPLICATIONS

This application is the national stage entry of International Application No. PCT/M2018/060432, filed on Dec. 20, 2018, which is based upon and claims priority to Hungarian Patent Application No. P1800386, filed on Nov. 16, 2018, and Hungarian Patent Application No. P1800427, filed on Dec. 13, 2018, the entire contents of which are incorporated herein by reference.

TECHNICAL FIELD

The subject of the invention is a procedure created to determine aircraft position. The subject of the invention also includes the arrangement for carrying out the procedure.

BACKGROUND

The on-board navigation, communication and surveillance equipment of aircraft used nowadays require considerable energy supplies and space, are heavy and expensive. The use of this equipment is thus limited within the field of general aviation. Usually, there is a lack of space, energy supplies are restricted and the infrastructure is scarce on board of general aviation aircraft. Consequently, bulky communication, navigation and surveillance (CNS) equipment cannot be used on a wide range of general aviation aircraft, such as on unmanned aerial vehicles (UAVs), gliders, hang gliders, ultralight aircraft, hot air balloons and ultralight aeroplanes. For this reason, most of these aircraft do not use any kind of CNS equipment. The exception is in certain cases satellite navigation (GPS) and a radio transmitter/receiver for communication. Only adequately certified and authorized equipment, fulfilling all the relevant rules and regulations may be used within the air traffic management system. A further constraint is the fact that certain surveillance systems used in air traffic management can only detect metallic objects. This way plastic UAVs, hang gliders, gliders made of wood or composite materials are not detectable. The GNSS (Global Navigation Satellite System) cannot be seen as a reliable system in itself, because it can easily be jammed and it does not include any information about its own integrity. This way its reliability cannot be established by using that system only. Similarly, the airspace user can also not be sure that the aircraft is located where indicated by the GNSS system, because this can provide misleading data due to jamming or spoofing. The state of the art includes the following solutions: Chinese patent No. CN104168585 describes a GSM/TD-SCDMA/TD-LTE mobile communication system. According to the invention, the loose coupling modularization structure mode is used and the instrument and testing method are realized by using the multithreading scheduling and dynamic chained library technologies. The main function of the drive test equipment is to collect data, carry out statistical analysis and examine the cellular network. It is similar to the present invention only in as much as it enables monitoring and analyzing several air interface signaling protocols. American patent No. US2015139061 A1 describes methods and arrangements for positioning using the DL-OTDOA (Observed Time Difference of Arrival) principle and LTE networks (the term coming from the expression 'Long-Term Evolution'—a 4th generation wireless communication standard). The primary goal of the invention is to improve positioning accuracy. The main problem of positioning within the third-generation cellular systems is still pending and can be summarized as follows: A-GPS (Assisted-GPS) positioning can offer very high precision data, but it provides in-door positioning and this is a disadvantage. The technical solutions inherent in OTDOA-IPDL (OTDOA-improved Data Link) and UTDOA (Uplink-Time Difference of Arrival) positioning yield better in-door coverage than A-GPS and also provide better accuracy. However, presently available sensor sensitivity is not sufficient for providing adequate accuracy. Accuracies in the range between A-GPS (some meters accuracy) and Cell-ID (cell data show in which sell the receiver is located, this yields an accuracy of approx. 2-30 km) can be expected. The solution is applicable for emergency positioning of non-moving objects and not for traffic monitoring or for providing separation and also it is not an integrated system.

The invention described in the Chinese patent No. CN106781478 relates to an LTE (long term evolution) signaling data based trajectory tracking method. The basis of the invention is to create and monitor tracks using LTE signaling data. The procedure uses only the OTDOA (Observed Time Difference of Arrival) value of the LTE signaling data, road matching is performed, target position is determined and the moving trajectory is recognized. The algorithm provided by this technology may be used by the user for: generating easily and quickly map data, collecting road toll data in databases, importing vehicle information into data bases real time, targeting the moving trajectory etc. Thus, the invention covers LTE signal processing and its tracking mechanism. It involves vehicle tracking and visualization on maps.

Korean patent NO. KR20030056266 discusses an adaptive positioning system within a wireless network. The system serves the purpose of movably assigning resources, taking into account the resources of the terminal within the network, which provides the actual positioning service in line with the requested QoS (Quality of Service) and accuracy. The solution relates to the LBS (Location Based Server).

The international patent No. WO2018125333 A2 describes a software-defined receiver using real long-term evolution (LTE) signals that may be used for navigation. The arrangement presented applies the LTE downlink structure, provides signal processing and tracking. This unit is to be found in the OTDOA capable LTE devices of our days, e.g. in cell phones. Besides, the software mentioned enables a navigation solution similar to GPS. It is not an integrated system. Korean patent No. KR20160139719 describes a positioning solution relying on LTE and GPS to be used by buses. GPS positioning data are forward with the LTE data service; thus the LTE network is only used for data transmission. A further difference to the present invention is the fact that Wi-Fi is also applied.

Chinese patent No. CN108226975 describes the positioning of ships. Just as in the previous invention, LTE technology is only used for data transmission, and here also GPS data are transmitted.

Patent application no. WO 2017/196510 A1 describes a method of locating a user equipment in emergency situations using observed time difference of arrival (OTDOA) techniques. However, the application does not describe how to use the method in air traffic control.

Patent application no. WO 2016/154939 A1 describes systems and methods for Unmanned Aerial Vehicle (UAV) safety, more particularly, features and steps of geo-fencing.

Patent application no. EP 3379282 A1 describes a monitoring system for monitoring an Unmanned Aerial Vehicle (UAV) and mechanisms for determining the position of the UAV. A first mechanism is based on telco triangulation or cell identification while a second mechanism is based on camera data-based detection.

Patent application no. US 2010/273504 A1 describes a system for location of a mobile device, without connection to the underlying wireless communications network.

Patent application no. US 2015/325129 A1 describes a method for geo-locating raw data exchanged between an aircraft and a ground receiver. It does not provide an integrated result. Using GNSS has several disadvantages. Its signal can be jammed by easily and cheaply procurable devices. As based on our investigations carried out in the vicinity of Budapest University of Technology and Economics, we observed approx. 1000 jamming events within the framework of 20 days. A further disadvantage is the fact that the time stamps emitted by the satellites are not controllable. None of the solutions listed above is capable of providing validated and reliable positioning, or to send the determined positioning data to the aircraft and/or to store in a public, uniform database.

SUMMARY

The invention aims to circumvent the problems of the already existing solutions and to create an efficient and safe arrangement and procedure to enhance positioning accuracy within a wireless communication system. The objective is to provide safe and integrated positioning of the aircraft to the air traffic management (ATM) system by using an individually identifiable, mobile, coded, on-board device of low energy uptake. A further objective is to enhance safety by sending the determined and validated positioning data to the aircraft and/or the airspace user, and also feeding it into a uniform, verified and possibly public data base.

The inventive step is based on the recognition that realizing the procedure as based on the independent claims creates an invention more beneficial than the previously existing ones. By using a mobile network, this recognition enables knowing the position of an aircraft equipped with a small sized, switched-on and low power consuming on-board device by 50 to 100 m accuracy, or even 5 m accuracy and this is possible even without using the means of satellite navigation. This being a new invention is also backed up by the recognition that within this procedure the aircraft can be identified by the codes generally applied within cellular telecommunications industry, such as the IMSI code used in the SIM cards, which is an internationally acknowledged and accepted identifier of cell phone users. The inventive step is also further enhanced by the fact that the determined position vector is not only sent to a database, but also to the aircraft and/or the airspace user thus informing him/her of its real time position and of the accuracy of the data being sent to him/her.

According to the above purpose, the most general implementation form of the solution according to the invention is described in independent claim 1. The most general form of the procedure of use is described in independent claim 6. The individual implementation forms are described in the dependent claims.

In general, the solution is an arrangement to position aircraft, in which the airspace user initiates using of a service of an air traffic manager, sends identifier data to the air traffic manager, the air traffic manager registers the aircraft identifier and provides standalone positioning. The invention is characterized by the fact that the IMSI number of the code card connected to the switched-on on-board device carried by the aircraft is used as identifier, during the initiation the user connects to the cellular network contracted by the air traffic manager, time stamp signals from at least three, but ideally four to six base stations are recorded, then observed time difference of arrival (OTDOA) data of these signals, proportionate to the distance from the cellular base stations, are calculated; then the OTDOA are sent through the cellular network to the location based server, and via the location based server to the air traffic management (ATM) system, the location based server and/or the ATM system determines the position of the given aircraft by coupling in real time the OTDOA data and the independently acquired surveillance data, a position vector data is thus created, this position vector data is then sent to the aircraft and forwarded into at least one database accessible to multiple airspace users.

It may be another feature that the cellular network is used to send flight plan data and/or satellite positioning data to the location based server, and via the location based server to the air traffic management system.

It may be another feature that the position vector data sent to the aircraft is stored and eventually displayed by the on-board device.

Another implementation form may be when the position vector data are stored in the database as coupled to the aircraft.

Another feature may be when the time difference of arrival data and the flight plans and/or the satellite positioning data are compared with each other by the location based server and/or the ATM system, and in case of discrepancy, the inaccurate data is indicated to the aircraft.

In general, the solution is an arrangement to position aircraft, where the arrangement comprises at least one aircraft and at least three cellular base stations and the aircraft disposes of an identifier equipment with transmitter/receiver antenna. It is a feature of the invention that the identifier equipment is an on-board device capable of identifying the airspace user and of forwarding the distance of the aircraft from the cellular base stations in the form of real-time time-difference-of-arrival data, while there is wireless connection between a location based server and the given on-board device, and further, the on-board device is equipped with a code card and a modem, the location based server is connected to a database shared with multiple airspace users via an ATM system.

It may be a feature of the arrangement that the on-board device is equipped with a display for displaying the position vector data.

It may be another feature that the code card includes a ROM and/or RAM used generally in cellular communications, the ROM and/or RAM having an individual identifier assigned to the airspace user.

Another implementation form may be in which the cellular network operates under the LTE standards and the code card is a SIM card installed into the modem, while a USIM card is used as the SIM card.

It may be another feature that on-board device is provided with a GNSS, and the GNSS is connected to the satellite system.

BRIEF DESCRIPTION OF THE DRAWINGS

The invention is presented in more detail by examples of implementation, using drawings.

On the following drawings,
FIGURE shows the arrangement of the invention.

DETAILED DESCRIPTION OF THE EMBODIMENTS

The arrangement of the invention is presented in the FIGURE. The arrangement is capable of determining the position of aircraft 1. Prior to positioning, the airspace users need to be clearly identified. All and every object moving in the airspace shall be considered as aircraft 1, including but not limited to unmanned aerial vehicles, gliders, ultralights, hang gliders, hot air balloons and ultralight airplanes. Airspace users are considered to include a wider scope of subjects, as the person controlling the unmanned aerial vehicle shall also be seen as airspace user. The arrangement is especially construed to determine the position of those small sized and/or unmanned aerial machines which, until now, have not carried any kind of on-board equipment. The low-energy on-board device 2 conceived to help positioning is placed on-board of the aircraft 1. Using the arrangement enables the operator to identify a high number of airspace users and the position of the aircraft 1 can be determined. While in the state of the art, these aircraft can generally be positioned only by using GNSS data, in the present invention the identifying equipment is such an on-board device 2 which disposes of an identifier with a code card 3, a transmitter/receiver antenna 4 and appliance, just as well as a modem 5. Optionally, it can also include a GNSS 6 equipment. In our example, the code card 3 is a SIM card (where SIM is the well-known acronym stemming from the expression Subscriber Identity Module), or, reasonably, the newer and safer USIM (Universal Subscriber Identity Module). The code card 3 possesses a ROM (Read Only Memory) and/or RAM (Random Access Memory) including an individual identifier code used within cellular telecommunications and now assigned to the airspace users. Here, ROM also stands for EEPROM (Electrically Erasable Programmable Read Only Memory). USIM differs from SIM in as much as it has a bigger memory capacity, can use a longer secret code and can offer a higher protection to the on-board equipment against data phishing attempts that may arrive through the network. Its task is to provide identification, authentication to the on-board device 2 on the cellular network 13. The code card 3 is installed into the on-board device 2, more specifically, into the modem 5 within it. The code card 3 includes such an integrated circuit which is capable of securely storing the IMSI (International Mobile Subscriber Identity) identifier employed to identify the users. IMSI is an internationally known and accepted identifier integrated into every code card 3, this enables the identification of the aircraft 1. The modem 5 shall comply with the 3GPP Release 9 standard (3GPP=3rd Generation Partnership Project) or the standards above that. If the on-board device 2 is also GNSS 6 compliant, it can also send satellite positioning data 9. Nevertheless, positioning is possible even without these. The location based server 7 (LBS) is a vital part of the arrangement. Relying on the observed time difference of arrival (OTDOA) data 8, and in certain cases, on satellite positioning data 9 it is the location based server 7 that calculates the position, the coordinates of the 2 on-board device, and converts these to the desired coordinate format, e.g. WGS-84, if needed. Hence, the location based server 7 does not necessarily need the satellite positioning data 9 to determine the position of the aircraft 1. The location based server 7 may also be able to calculate data relying on the flight plan received from the aircraft 1 or from eventual surveillance data and can also verify the OTDOA data 8. The location based server 7 may be created individually or under the supervision of the air navigation service provider (ANSP), or further, as part of the air traffic management system 10. Regarding the operation of the arrangement, the air traffic management system and the ANSP can be seen as interchangeable notions, it can be regarded as the location where the yielded positioning data are collected and stored. In this implementation form, the location based server 7 and the air traffic management system 10 are connected. The task of the location based server 7 is to forward the positioning data yielded from the OTDOA data 8 and eventually, also the satellite positioning data 9, to the air traffic management system 10. The OTDOA data 8 play a key role in positioning.

So, the air traffic management system 10 receives the OTDOA data 8, the positioning data as calculated by the location based server 7 from the OTDOA data 8, in certain cases, the satellite positioning data 9, the flight plans and other surveillance data, which then are processed, and compared by the ATM system 10, the outlier and/or otherwise corrupt data are erased, and the reliable position vector data 14 are determined. In another implementation form, this can also be done by the location based server 7, if needed. This way, the position vector data 14 are reliable, validated data. In order to provide integrity, at least three sources need to be incorporated into the calculations. These position vector data 14 are then sent to the location based server 7, and via the location based server 7 also to the aircraft 1. At the same time, we indicate to the location based server 7 and/or the aircraft 1, if either the OTDOA data 8 and/or the satellite positioning data 9 sent by them were eventually incorrect and unreliable. Optionally, the position vector data 14 may also be displayed in the aircraft 1 by using a display. The steps enumerated above may naturally be repeated again and again, the active on-board devices 2, the location based server 7 and the ATM system 10 are continuously interconnected with each other, automatic positioning happens in real time. Satellite positioning data 9 are available within the arrangement, if satellite system 11 is part of the arrangement. In this case, satellite positioning data 9 can also be sent. As it has been described before, the use of satellite system 11 and the availability of satellite positioning data 9 are optional, the arrangement is capable reliable positioning even without those. A-GPS (assisted GPS) data may also be used as satellite positioning data 9. The arrangement includes at least three cellular base stations 12 to enable 2D positioning data to be determined. If 3D coordinates are also to be established, then at least four cellular base stations 12, located in different heights, are needed.

Positioning vector data 14 may also be sent from the ATM system 10 to a potentially public database 15. Such an implementation form is also possible, where the position vector data 14 are sent from the location based server 7 to the database 15. Communication takes place and data are sent and received via the cellular network 13. The cellular network 13 may operate in compliance with the 2G, 3G or LTE standards, as long as the OTDOA function is available and operational, and it fulfills the 3GPP Release 9 standards or anything above.

Using the invention, in accordance with the desired outcome, the airspace user first sends his/her IMSI identifier to the air navigation service provider, the latter registers the identifier. If there is a flight plan available, the airspace user also sends this to the air navigation service provider. In this case the location based server 7 and/or the ATM system 10 has a further source from which to calculate and compare data. Subsequently, the on-board device 2 needs to be switched on the aircraft. As long as the on-board device 2 is switched on, the real-time positioning is continuous. The on-board device 2 logs in to that telecommunication provider with which the air navigation service provider is contracted with. The airspace user, or the aircraft 1 requests its positioning data to be collected by the air navigation service provider or the air traffic management system 10. This step can be carried out by phoning, clicking on a button or even the flight plan may include this information. With this step, positioning becomes activated, and from now on the location based server 7, the air navigation service provider or the air traffic management system 10 is continuously aware of the position of the registered aircraft 1 within the arrangement. The on-board device 2 records the time stamp created at the start of the signal and sent by at least three, but optimally four-six cellular base stations, then, as based on these, calculates the OTDOA data 8, and via the cellular network 13 forwards this OTDOA data 8 to the location based server 7. If the on-board device 2 also includes a GNSS 6 and is connected to a satellite system 11, then it can also send satellite positioning data 9 to the location based server 7. The location based server 7 collects and processes the position data yielded from the OTDOA data 8 and, optionally, from the further positioning data (satellite positioning data, other surveillance data and flight plans), then forwards this to the air traffic management system 10, who in turn, also collects, compares and uses these data, as based on these, creates reliable position vector data 14 which are then sent to the location based server 7, and a database 15, which database 15 is optimally public and may be several of them. In another case, the location based server 7 may also send the position vector data 14 to the database 15. Other surveillance data may for instance be the known radar signal data. The ATM system 10 or the location based server 7 may optionally send the reliable position vector data 14 to the aircraft 1 as well, ideally in a format compatible with the on-board device 2 of the aircraft 1, e.g. as WGS 84 coordinates, so that it may continually be aware of its position, as calculated from surely reliable data, and eventually this position can also be displayed by the on-board device 2. In order to reduce data communication load, it is not always necessary to send the position vector data 14 to the aircraft, they are obligatory to be sent when one or some of the data were inaccurate and so their integrity became corrupted.

The invention has numerous advantages. One of these is the fact that, after checking the data, the true and validated position data may be sent to the on-board device, so the airspace user may continuously by aware of its accurate position and the source of the eventually wrong data. For example, if, in case of jamming, the GNSS sends inaccurate data to the on-board device, the airspace user can only know this, if he/she receives real-time, validated, accurate data from the location based server and if the location based server identifies exactly which data is corrupted. This helps prevent accidents and incidents which come about when an aircraft sends allegedly true but in fact, inaccurate, data and air traffic management incorporates this as reliable data. Further advantage of the invention is the fact that the on-board device is small, low weight, safe, integrated, mobile and of low energy consumption. The accuracy of the positioning solution is 100 m (in the WGS-84 system), but even 5 m accuracy can be achieved. Knowing the position with such an accuracy is sufficient to provide safe separation between aircraft. It is beneficial that the air navigation service providers will easily be able to integrate the data received from the location based server into the present air traffic management and in the future Unmanned Aircraft Traffic Management (UTM) system. A further advantage is the fact that the on-board device operates even without GNSS. The on-board device is low weight, of low energy uptake or logically, disposes of batteries. It is mobile, it can be carried in a small place, even in a pocket. Its radiation power is low, this enables the use of very low weight batteries. The low weight is especially beneficial in case of unmanned aerial vehicles. It is also advantageous that it does not need to be integrated into the on-board systems of non-autonomous aircraft. It does not require regular calibration. The on-board device possesses an individual identifier, thus there is no need to set the transponder code before each flight. It is also an advantage that both the on-board device and the ground infrastructure are difficult to be jammed, so positioning of a large number of aircraft and within urban environments (of noisy radio frequency spectrum) is also possible. If a USIM card is used, the communication is encrypted and secure. It paves the way to enable beyond visual line of sight (BVLOS) unmanned aerial vehicle operations and autonomous flights. Since there is no need to change the transponder code at the national borders or FIR (flight information region) borders, it can assist flights beyond the starting FIR. It is a technology easily available and financially feasible to the users. It may provide an opportunity to the operators of unmanned aerial vehicles to safely operate their devices in areas in which they have not been authorized to fly until now, like at aerodromes or other restricted areas. The aircraft that have gone undetected until now become observable, their accurate position can be monitored in real time and safe separation can be provided within the air traffic management. This can lead to a significant reduction in the risks of accidents and material damage. Finally, it is an important advantage that the determined and reliable position vector data are sent to a public database, so the current airspace users can be recorded in a regulated, real-time and uniform catalogue. The data of the given aircraft and its real time position may be stored in a coupled way as well, in this case the actual position of any particular aircraft can be determined from the database.

The area of application of the invention is air traffic management, positioning of aircraft and the enhancement of air transport safety.

In addition to the above examples, the invention may be implemented within the scope of protection in other forms and with other procedures.

What is claimed is:

1. A method for a positioning of an aircraft, wherein an airspace user initiates using of a service provided by an air navigation service provider and sends identifying data to the air navigation service provider, the air navigation service provider registers an aircraft identifier, carries out a positioning the method, comprising:
    as the aircraft identifier, using an International Mobile Subscriber Identity (IMSI) number of a code card connected to a switched on on-board device and placed on board the aircraft, wherein the airspace user registers in to a cellular network contracted by the air navigation service provider,
    recording time stamps emitted by at least three cellular base stations using an observed time difference of arrival (OTDOA) feature from a mobile operator,
    calculating an observed time difference of arrival data proportionate to a distance from the at least three cellular base stations, sending the observed time difference of the arrival data through the cellular network to a location based server, and via the location based server to an air traffic management system, coupling and comparing in real time the observed time difference of the arrival data with observed time difference of arrival from at least two further positioning data, identifying any outlier and/or corrupt positioning data, wherein the location based server and/or the air traffic management system determines a validated position of the aircraft, creating validated position vector data, sending the validated position vector data to the aircraft to inform the aircraft about a real time position of the aircraft, and forwarding the validated position vector data into at least one database accessible to multiple airspace users, wherein the at least two further positioning data is at least one of satellite positioning data, surveillance data and flight plan data.

2. The method according to claim 1, wherein the flight plan data and/or the satellite positioning data are sent through the cellular network to the location based server and to the air traffic management system via the location based server.

3. The method according to claim 2, wherein the validated position vector data sent to the aircraft is stored and displayed, with the switched on on-board device.

4. The method according to claim 2, wherein the validated position vector data are stored in the at least one database as coupled to the aircraft.

5. The method according to claim 1, wherein the validated position vector data sent to the aircraft is stored and displayed, with the switched on on-board device.

6. The method according to claim 5, wherein the validated position vector data are stored in the at least one database as coupled to the aircraft.

7. The method according to claim 1, wherein the validated position vector data are stored in the at least one database as coupled to the aircraft.

8. The method according to claim 7, wherein the observed time difference of the arrival data and the flight plan data and/or the satellite positioning data are compared by the location based server and/or the air traffic management system and in case of discrepancy, inaccurate data is indicated to the aircraft.

9. A system for carrying out the method of claim 1, comprising the aircraft and the at least three cellular base stations, the aircraft carries an identifier equipment equipped with a transmitter/receiver antenna, wherein the identifier equipment is made up of the switched on on-board device, and the switched on on-board device is configured for identifying the airspace user and for real-time forwarding a distance of the aircraft from the at least three cellular base stations by the observed time difference of the arrival data; the switched on on-board device is connected through the cellular network to the location based server and is equipped with the code card and a modem, wherein the location based server is, via the air traffic management system, connected to the at least one database accessible to the multiple airspace users; the location based server and/or the air traffic management system is configured to collect and compare position data yielded from the observed time difference of the arrival data and the at least two further positioning data, the at least two further positioning data is any of the satellite positioning data, the surveillance data and the flight plan data; the location based server and/or the air traffic management system is configured to determine the validated position vector data; and the validated position vector data is configured to be sent to the aircraft.

10. The system according to claim 9, wherein the switched on on-board device is equipped with a display for displaying the validated position vector data.

11. The system according to claim 10, wherein the code card comprises a Read Only Memory (ROM) and/or a Random Access Memory (RAM) used generally in cellular communications, the ROM and/or the RANI having an individual identifier assigned to the airspace user.

12. The system according to claim 10, wherein the cellular network is a Long-Term Evolution (LTE) network and the code card is a Subscriber Identity Module (SIM) card installed into the modem, and a Universal Subscriber Identity Module (USIM) card is used as the SIM card.

13. The system according to claim 10, the switched on on-board device is equipped with a Global Navigation Satellite System (GNSS), the GNSS is connected to a satellite system through a wireless connection.

14. The system according to claim 9, wherein the code card comprises a Read Only Memory (ROM) and/or a Random Access Memory (RAM) used generally in cellular communications, the ROM and/or the RANI having an individual identifier assigned to the airspace user.

15. The system according to claim 14, wherein the cellular network is a Long-Term Evolution (LTE) network and the code card is a Subscriber Identity Module (SIM) card installed into the modem, and a Universal Subscriber Identity Module (USIM) card is used as the SIM card.

16. The system according to claim 14, the switched on on-board device is equipped with a Global Navigation Satellite System (GNSS), the GNSS is connected to a satellite system through a wireless connection.

17. The system according to claim 9, wherein the cellular network is a Long-Term Evolution (LTE) network and the code card is a Subscriber Identity Module (SIM) card installed into the modem, and a Universal Subscriber Identity Module (USIM) card is used as the SIM card.

18. The system according to claim 17, the switched on on-board device is equipped with a Global Navigation Satellite System (GNSS), the GNSS is connected to a satellite system through a wireless connection.

19. The system according to claim 9, the switched on on-board device is equipped with a Global Navigation Satellite System (GNSS), the GNSS is connected to a satellite system through a wireless connection.

* * * * *